United States Patent [19]

Mori

[11] 4,325,664
[45] Apr. 20, 1982

[54] CUTTING TOOL

[75] Inventor: Yoshikatsu Mori, Itami, Japan

[73] Assignee: Sumitomo Electric Industries, Ltd., Osaka, Japan

[21] Appl. No.: 155,090

[22] Filed: Jun. 2, 1980

[30] Foreign Application Priority Data

Jun. 30, 1979 [JP] Japan ............................ 54-91684[U]

[51] Int. Cl.³ .......................... B23B 31/44; B23C 5/26
[52] U.S. Cl. ....................................... 409/234; 279/8; 409/232
[58] Field of Search ............... 409/233, 234, 231, 232; 279/8, 91

[56] References Cited

U.S. PATENT DOCUMENTS

| 2,371,089 | 3/1945 | Weddell | 409/232 X |
| 2,685,233 | 8/1954 | Kaiser | 409/233 |
| 2,912,904 | 11/1959 | Peterson | 409/233 |
| 3,577,809 | 5/1971 | Brandl et al. | 409/232 X |

FOREIGN PATENT DOCUMENTS 589793 6/1947 United Kingdom .................. 279/8

Primary Examiner—Z. R. Bilinsky
Attorney, Agent, or Firm—Wenderoth, Lind & Ponack

[57] ABSTRACT

A cutting tool including a cutter and an arbor head. The cutter can be attached to and detached from the arbor head in an extremely simple manner without the need of removing the bolt.

3 Claims, 5 Drawing Figures

CUTTING TOOL

The present invention relates to a cutting tool.

With conventional cutting tools, it has been a common practice to fit a cutter 3 (which is in the form of a face mill in case of FIG. 1) on a protuberance 2 provided on the central part of an arbor head 1 coaxially therewith as shown in FIG. 1. For fixing the cutter 3, a flanged washer 4 is inserted in a hole 5 provided in the cutter 3, and a bolt 6 is screwed through the washer 4 into the protuberance 2.

A disadvantage of the conventional cutting tools is that to remove the cutter 3, it is necessary to screw out the bolt 6. This requires a lot of time. Another disadvantage of the conventional cutting tool is that, in order to remove the cutter 3 from a vertical type milling machine, the bolt 6 has to be unscrewed with one hand with the cutter 3 supported with the other hand. This is attended with great danger, because a momentary lack of attention can cause the cutter 3 to slip out of the fingers of the worker.

It is an object of the present invention to eliminate and solve the above-described disadvantages.

It is another object of the present invention to provide a cutting tool characterized by a unique mechanism for attaching the cutter to, and detaching the same form, the arbor head.

It is a further object of the present invention to provide a cutting tool in which the cutter can be easily detached from the arbor head and yet is prevented from slipping out of the fingers of the worker.

With these objects in view and as will become apparent from the following detailed description, the present invention will be more clearly understood in connection with the accompanying drawings, in which.

Figure 1:
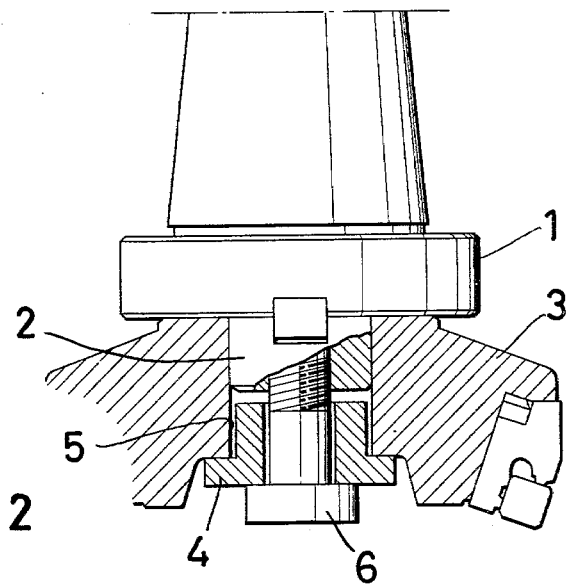
FIG. 1 is a fragmentary sectional view of a conventional cutting tool.
Figure 2:
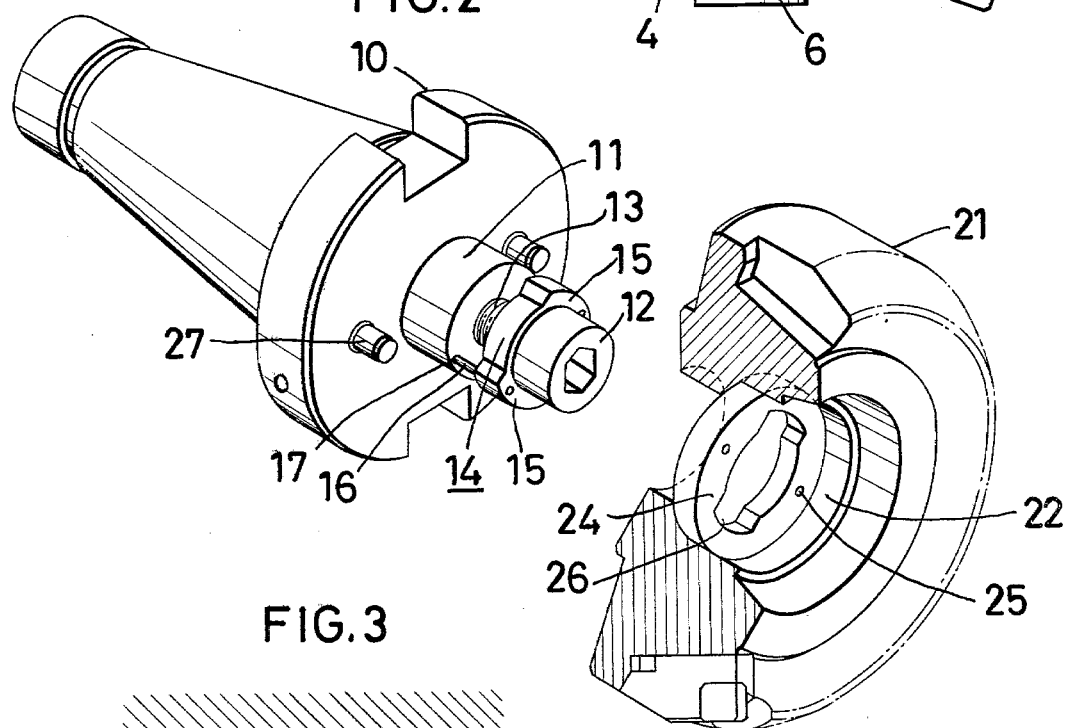
FIG. 2 is an exploded perspective view partly in section of a cutting tool according to the present invention.
Figure 3:
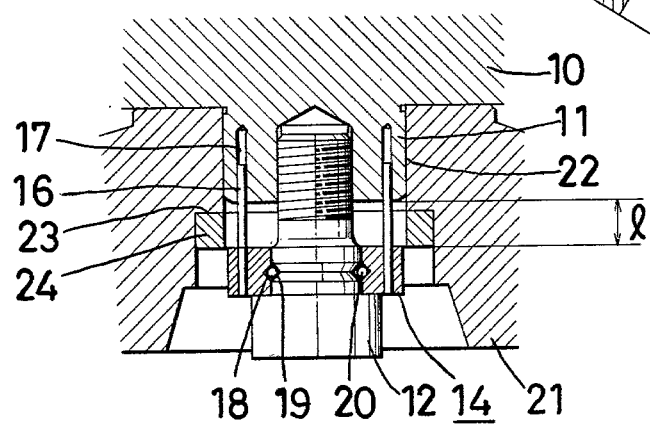
FIG. 3 is a fragmentary sectional view of a portion thereof, illustrating how its parts are assembled.

Referring now to FIGS. 2 and 3, a cutting tool in accordance with the present invention includes an arbor head 10, a cylindrical protuberance 11 provided on the central part of the arbor head 10 coaxially therewith, a bolt 12, the threaded portion 13 of which is screwed into the protuberance 11 coaxially therewith, and a collar 14 fitted on the shank of the bolt 12. The pheriphery of the collar 14 is provided with two enlarged portions 15 which are symmetrical about the axis of the coller 14. Two guide pins 16, which are fixed to the two enlarged portions 15 in parallel with the axis of the protuberance 11, are slidably inserted in two holes 17 provided in the protuberance 11 in parallel with the axis thereof.

The internal surface of the collar 14 is provided with an annular groove 18 in such a manner that it faces an annular groove 19 provided in the shank of the bolt 12 so that an annular space may be formed by the annular grooves 18 and 19 and a plurality of steel balls 20 may be held therein.

When the bolt 12 is screwed into the protuberance 11, the steel balls 20 cause the collar 14 to follow the axial movement of the bolt 12 toward the arbor head 10. When the bolt 12 is loosened, they cause the collar 14 to follow the axial movement of the bolt 12 away from the arbor head 10. In either case, the collar 14 is hindered from rotating on its own axis because of the guide pins 16 inserted in the holes 17.

A cutter 21 is provided with a center hole 22, and a shoulder 23 is provided midway of the depth of the center hole 22. A ring 24, which serves as an inward flange, is fixed to the shoulder 23 by suitable means such as spring pins inserted in holes 25 provided in the ring 24. A hole 26 in the ring 24 has a shape similar to, but slightly larger than, the shape of the collar 14. Since the head of the bolt 12 is smaller in diameter than the collar 14, the ring 24 can be freely passed over the head of the bolt 12 and the collar 14.

Figure 5:
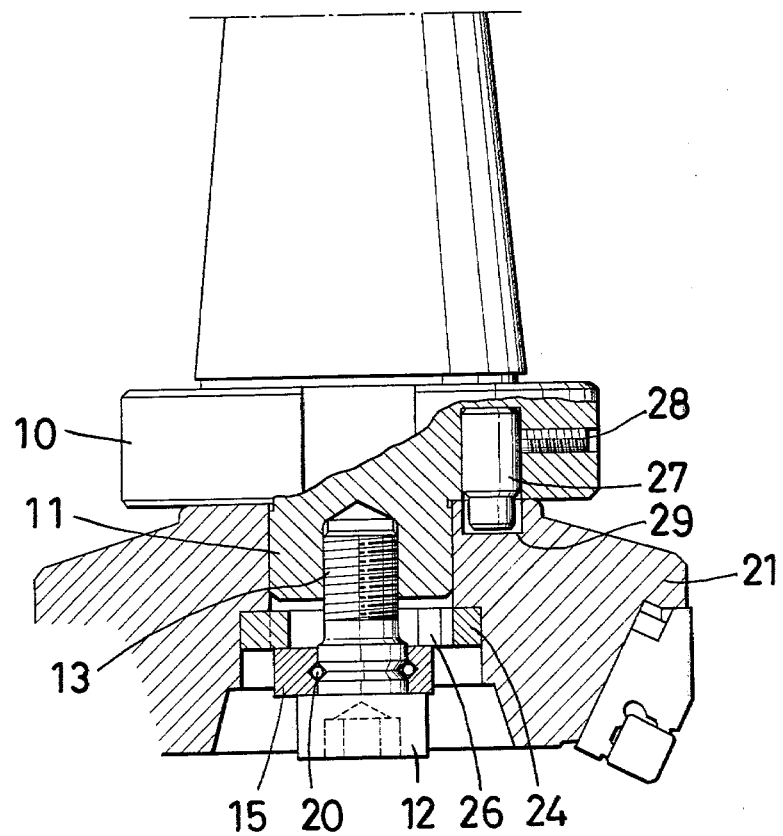
FIG. 5 is a fragmentary sectional view taken along line V—V of FIG. 4.

Referring now to FIGS. 2 and 5, two pins 27 are provided on the end surface of the arbor head 10 which faces the cutter 21. The pins 27 are clamped to the arbor head 10 symmetrically about the axis of the arbor head 10 by means of screws 28 screwed radially into the arbor head 10.

Figure 4:
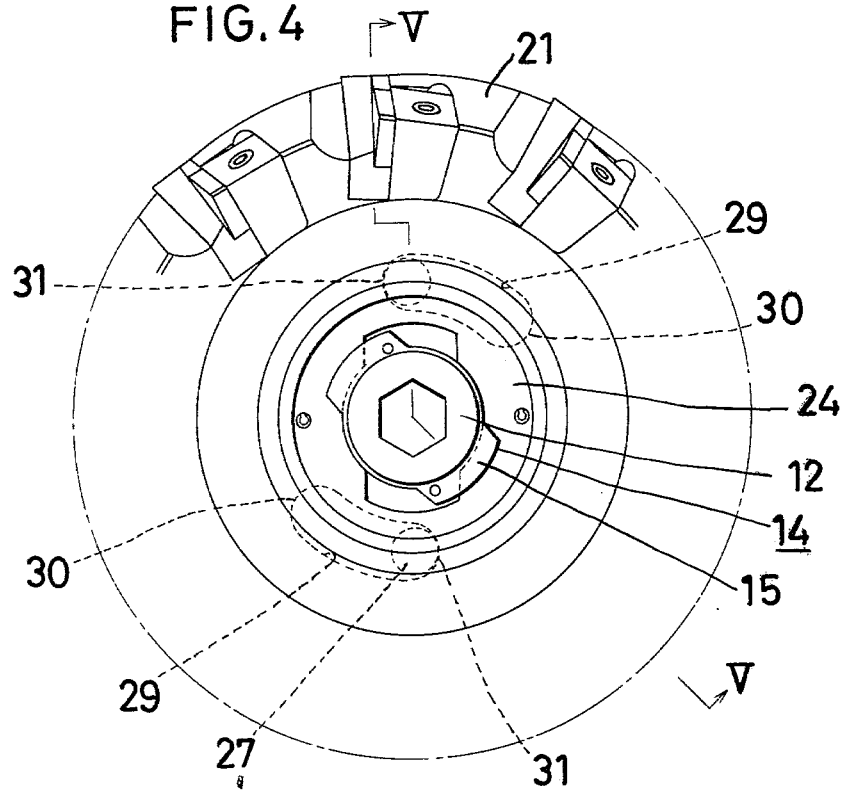
FIG. 4 is a front view of the cutting tool according to the present invention.

Referring now to FIGS. 4 and 5, two arcuate grooves 29 are provided in the surface of the cutter 21 which faces the arbor head 10. The two grooves 29 are disposed to be symmetrical about the axis of the cutter 21 and so that the pins 27 are allowed to fit in the grooves 29.

In the alternative, the pins 27 may be provided on the surface of the cutter 21 which faces the arbor head 10, and the arcuate grooves 29 may be provided in the surface of the arbor head 10 which faces with the cutter 21.

In order to mount the cutter 21 on the arbor head 10, the ring 24 is first passed over the head of the bolt 12 and the collar 14. Then the cutter 21 is mounted on the protuberance 11 until the surface of the cutter 21 facing the arbor head 10 comes in contact with the arbor head 10 as shown in FIG. 3. The ring 24 now fits in the space which is left betweeen the protuberance 11 and the collar 14, and each of the pins 27 fits in the groove 29 in such a manner that the pin 27 is positioned at one end 30 of the groove 29.

Then the cutter 21 is turned until each of the pins 27 comes in contact with the other end 31 of the groove 29. FIG. 4 shows the cutter 21 which has already been turned. In case of the embodiment shown in FIG. 4, the cutter 21 has to be turned by an angle of about 45° in order to allow each of the pins 27 to come in contact with the other end 31 of the groove 29.

When the cutter 21 has been turned until each of the pins 27 comes in contact with the other end 31 of the groove 29, in inwardly extending flange formed by the ring 24 comes to engage with the enlarged portions 15 of the collar 14 as shown in FIGS. 4 and 5. When the bolt 12 is tightened in this condition, the inward flange formed by the ring 24 is pressed by the enlarged portions 15 against the protuberance 11 and thereby the cutter 21 is securely clamped to the arbor head 10.

From the foregoing, it will be recognized that a space l has to be left between the protuberance 11 and the collar 14 as shown in FIG. 3 so that the inwardly extending flange formed by the ring 24 may be turned therebetween. The space l can be adjusted by turning the bolt 12.

In order to detach the cutter 21 from the arbor head 10, the order of procedure has only to be reversed.

In case of the embodiment shown in FIG. 4, the cutter 21 is turned clockwise, as viewed from the arbor side, in cutting operation. In this case, the end 31 of each groove 29 imparts cutting resistance to the pin 27. In order to allow the cutter 21 to be turned counter clockwise in cutting operation, each groove 29 must be shifted from the position shown in FIG. 4 in the clockwise direction as viewed from the arbor side, so that the line of apsides of the hole 26 passes by the end 30 of each groove 29.

The cutting tool in accordance with the present invention has an advantage that the cutter can be attached to and detached from the arbor head in an extremely simple manner without the need of removing the bolt.

While I have disclosed a preferred embodiment of the present invention, it is to be understood that it has been described by way of example only, various other modifications being obvious.

What I claim is:

1. A cutting tool comprising an arbor head having a protuberance provided in the central part of said arbor head coaxially therewith, a bolt adapted to be screwed into said protuberance, a collar fitted on the shank of said bolt, the periphery of said collar being provided with two enlarged portions symmetrical about the axis of said collar, said collar being adapted to follow the axial movement of said bolt but not to rotate on its own axis, two guide pins, one end of each of said two guide pins being fixed to each of said two enlarged portions of said collar, the other end thereof being slidably inserted in each of two holes provided in said protuberance in parallel with the axis thereof, a cutter provided with a center hole having a shoulder midway of the depth thereof, and a ring fixed to said shoulder and provided with a hole having a shape similar to, but slightly larger than, the shape of said collar.

2. A cutting tool as set forth in claim 1, wherein a plurality of steel balls are held in an annular space formed by two annular grooves provided in the inner wall of said collar and in the shank of said bolt, respectively.

3. A cutting tool as set forth in claim 1, wherein two pins are fixed to the surface of said arbor head which faces said cutter and are adapted to fit in two arcuate grooves provided in the surface of said cutter which faces said arbor head, said two arcuate grooves being symmetrical about the axis of said cutter.

* * * * *